Feb. 28, 1967 V. ČERNÝ 3,307,024

COUNTER FOR DATA PROCESSING CONTROL SYSTEM

Filed Sept. 2, 1965

INVENTOR.
Václav Černý
BY
Richard Low
Agt.

3,307,024

COUNTER FOR DATA PROCESSING CONTROL SYSTEM

Václav Černý, Prague, Czechoslovakia, assignor to Vyzkumný ústav matematických strojů, Prague, Czechoslovakia Filed Sept. 2, 1965, Ser. No. 484,710
1 Claim. (Cl. 235—92)

Figure 1:
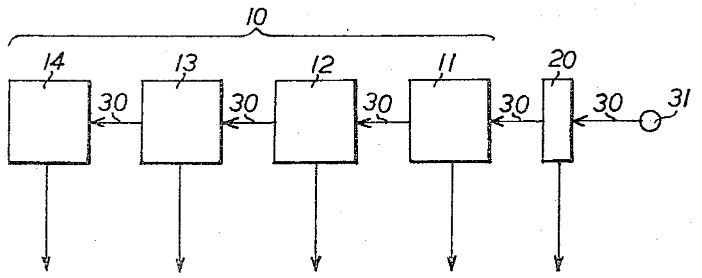

The present invention relates to a counter for data processing control systems, and more particularly for program controlled computers.

As is well known, computers are controlled by means of a command, or control unit. The command unit contains, as a major component thereof, a command register, into which instructions or commands are placed, and which then determines the operation of the machine in accordance with the program. Various instructions are used. For example, a single address instruction contains, besides the operations code, a single address usually represented by a number, which number determines the particular numeral to be used in the operation. Because the instruction does not have room for the address of the next subsequent instruction, it is usual to provide that the subsequent address is assigned a number larger by one than the preceding one. This system, called sometimes a sequential system, is operated such that the address of the following instruction is the same as the previous instruction incremented by one. In order to provide for proper addressing, single address machines contain a counter, or counter register, which always is incremented and which contains the address of the next following instruction.

The present invention relates to such automatic program controlled computers which operate with words containing two instructions. If the word contains a pair of instructions, then the counter register must be built in such a manner that for each address in the instruction, two operations are carried out. It is important to distinguish which one of the two operations, as determined by the particular address, is being carried out at any one time.

Counter registers of such a type have been proposed in which the counter register is operated in such a manner that only every other clock pulse cycles the register. In addition, a storage element is provided which is operated every other operation, and thus distinguishes between even and odd operation numbers. Provision of such additional storage units, or the skipping of every other pulse, introduces additional difficulties and the possibilities of error.

It is an object of the present invention to provide a data processing system capable of operating with a pair of instructions, from a single address, which is simple and does not require extensive modification as compared to a system operating with a single instruction only.

Briefly, in accordance with the present invention, counter registers are provided as is usual in computer equipment. In addition, however, a binary operating single counter is connected to the counter registers, in advance of the lowest stage thereof which, in a binary manner, indicates which one of the instructions are being carried out, and which is capable of distinguishing between even and odd instruction or command numbers.

Figure 2:
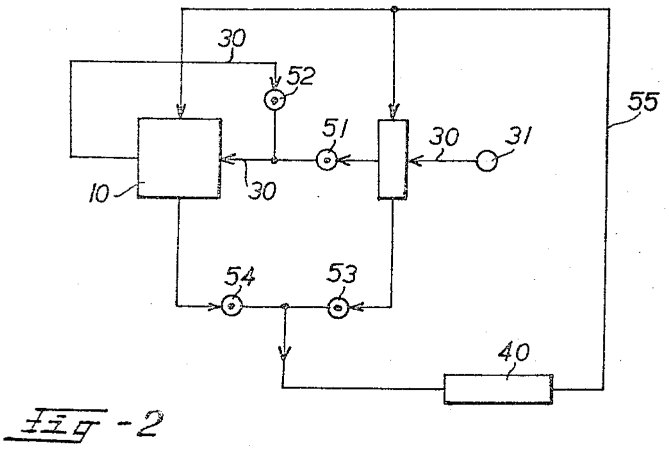

The structure, organization and operation of the invention will now be described more specifically in the following detailed description with reference to the accompanying drawings, in which:

FIG. 1 is a schematic diagram in block form illustrating the inventive concept and FIG. 2 illustrates a different embodiment of the inventive concept utilizing a series counter.

Referring now to the drawings, and more particularly to FIG. 1:

The counter register comprises a pair of sections 10, 20. Section 10 itself consists of sub-units 11, 12, 13, 14, formed as decimal, parallel counters for units, tens, hundreds, and thousands, for example. All of the elements are interconnected by a transfer line 30. The input counter 20 operates in a binary system, whereas each one of the elements 11 to 14 operates in the decimal system. It will be seen that the binary counter 20 will distinguish between even and odd inputs of instructions, the instruction number itself, however, being decoded in the section 10.

An example of a counter register for series output is shown in FIG. 2. The lowest section of the counter again consists of a binary counter element 20, which is interconnected by means of the transfer line 30 to an AND gate 51 and then to a decimal counter 10, which may consist of a single stage only. The transfer line 30 is carried out from the decimal stage 10 and connected through a feedback control gate 52 back to the input end of transfer line 30. The content of the counter register in this case is not contained within the single subunits or within decades, but rather circulates in a circulating storage register 40, connected to the counter unit 10 by means of control gates 54, 53, and return line 55.

The various gates 51, 52, 53, 54 are formed as AND gates, that is, gates which can open at specific times. The other inputs to the AND gates are not shown, since the timing of the circuit can be controlled, as is well known in the art, from the clock source and timing system of the computer apparatus.

The operation of the circuit according to FIG. 2 is similar to that of FIG. 1; an input applied to terminal 31 of transfer line 30 is first counted in the binary stage 20; upon the second count, an impulse transmitted further over transfer line 30, through gate 51 (opened by a suitable second input from the timing circuit of the machine) will start the series register 10, and cause continued circulation through gate 52 and gate 54 and circulating register 40 as determined by the timing circuit of the computer apparatus.

The present invention has been described in terms of block diagrams and schematic diagrams. It will be obvious to those skilled in the art that the logic and particular components and elements indicated by the block digarams and interconnections may be implemented by a variety of well-known circuitry. It is therefore thought unnecessary to describe the exact components on a level more detailed than that required for the understanding by those skilled in the art. It is also to be understood that appropriate interlock or buffer circuit paths are to be provided when necessary, in accordance with good design techniques, to prevent feedback of signals or undesirable circuit paths which might influence other circuits to respond spuriously and not in accordance with the invention concept. Such buffers and interlock circuits are not shown on the drawings, and the detailed description thereof has been omitted in the interest of clarity and brevity. Their proper use will be obvious to those skilled in the art.

The logic elements described and shown in the drawings and utilized by the apparatus of the present invention are known in the art and described in various publications, for example, in the book entitled, "Design of Transistorized Circuits for Digital Computers," by A. I. Pressman: John F. Ryder, Publisher, Inc., New York, 1959.

Regarding instrumenting the registers themselves, reference may be had to "High-Speed Computing Devices," by Engineering Research Associates: McGraw-Hill Book Company, Inc., New York, 1950; and to "Digital Computer Components and Circuits," by R. K. Richards: D. Van Nostrand Company, Inc., Princeton, 1957.

I claim:

A counter register for a control for data processing apparatus operated with words containing two instructions, comprising a decimal counter, a binary counter connected in advance of the decade of said decimal counter for the lowest order digit to process data of the lowest order in binary system in advance of processing in the decimal system whereby the odd numbered and even numbered instructions comprising each instruction word are differentiated from each other, said decimal counter being a single stage counter having a feedback line interconnecting the output and input of said single stage counter, said counter register further comprising first gate means for connecting said binary counter to said single stage counter, second gate means through which said output and input of said single stage counter are interconnected through said feedback line, third gate means, and a circulation register, said circulation register being connected to said single stage counter through said third gate means to enable said single stage counter to operate as a series counter.

References Cited by the Examiner

UNITED STATES PATENTS

| | | | |
|---|---|---|---|
| 2,470,716 | 5/1949 | Winfield | 235—92 |
| 2,922,576 | 1/1960 | Overbeck | 235—92 |

MAYNARD R. WILBUR, *Primary Examiner.*

J. F. MILLER, *Assistant Examiner.*